United States Patent
Schneider et al.

(10) Patent No.: US 12,351,343 B2
(45) Date of Patent: Jul. 8, 2025

(54) METHOD FOR AUTONOMOUS SERVICING OF AN AIRCRAFT, AND A SERVICE PANEL, AIRCRAFT AND SYSTEM PROVIDING FOR AUTONOMOUS SERVICING OF AN AIRCRAFT

(71) Applicant: Airbus Operations GmbH, Hamburg (DE)

(72) Inventors: Frank Schneider, Ahlerstedt (DE); Hannes Müller, Hamburg (DE); Michael Rempe, Hamburg (DE); Tim Lübbert, Wedel (DE); Frederik Albers, Ahlerstedt (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/493,939

(22) Filed: Oct. 25, 2023

(65) Prior Publication Data
US 2024/0158100 A1 May 16, 2024

(30) Foreign Application Priority Data
Oct. 27, 2022 (EP) .................................... 22204138

(51) Int. Cl.
*B64F 5/40* (2017.01)
*B64F 5/30* (2017.01)
*B64F 5/60* (2017.01)
*B64F 5/50* (2017.01)

(52) U.S. Cl.
CPC ................. *B64F 5/40* (2017.01); *B64F 5/30* (2017.01); *B64F 5/60* (2017.01); *B64F 5/50* (2017.01)

(58) Field of Classification Search
CPC ...... B64F 5/40; B64F 5/30; B64F 5/60; B64F 5/50
See application file for complete search history.

(56) References Cited

U.S. PATENT DOCUMENTS

| | | |
|---|---|---|
| 11,091,276 B2 | 8/2021 | Clermont et al. |
| 2007/0051852 A1 | 3/2007 | Mccoskey et al. |
| 2017/0283092 A1* | 10/2017 | Brown ................. B64F 5/30 |
| 2019/0365936 A1* | 12/2019 | Flashaar ............... B64F 5/30 |
| 2021/0053700 A1 | 2/2021 | More et al. |

FOREIGN PATENT DOCUMENTS

| | | |
|---|---|---|
| DE | 102011117234 A1 | 5/2013 |
| WO | 2017222848 A1 | 12/2017 |

OTHER PUBLICATIONS

European Search Report for corresponding European Patent Application No. 22204138 dated Mar. 29, 2023; priority document.

* cited by examiner

Primary Examiner — Rodney A Bonnette
(74) Attorney, Agent, or Firm — Greer, Burns & Crain, Ltd.

(57) ABSTRACT

The present disclosure relates to a method for servicing an aircraft by a ground service unit. The method comprises reading a wireless parameter signal from a transponder at the aircraft, decoding the wireless parameter signal to derive at least one aircraft parameter of a water supply system and/or a waste system of the aircraft, moving a servicing equipment interface to a service panel of the aircraft, connecting the servicing equipment interface to a coupling at the service panel, servicing the aircraft via the servicing equipment interface corresponding to the at least one aircraft parameter, and writing a service parameter into the transponder at the aircraft.

18 Claims, 4 Drawing Sheets

METHOD FOR AUTONOMOUS SERVICING OF AN AIRCRAFT, AND A SERVICE PANEL, AIRCRAFT AND SYSTEM PROVIDING FOR AUTONOMOUS SERVICING OF AN AIRCRAFT

CROSS-REFERENCES TO RELATED APPLICATIONS

This application claims the benefit of the European patent application No. 22204138.6 filed on Oct. 27, 2022, the entire disclosures of which are incorporated herein by way of reference.

FIELD OF THE INVENTION

The present disclosure generally relates to autonomous servicing of an aircraft. Particularly, the present disclosure relates to a method for servicing an aircraft, a service panel of an aircraft providing at least one aircraft parameter via a transponder, as well as a corresponding aircraft and servicing system.

BACKGROUND OF THE INVENTION

Currently, servicing of an aircraft, such as filling potable water into a corresponding aircraft tank and/or removing waste from a waste tank, is carried out manually by ground staff. After manually driving a corresponding service cart to the aircraft, these tasks require multiple steps to be performed by the ground staff, including (among others) opening a service panel flap, opening a fill/drain nipple protection cap, disinfecting or cleaning the service panel and/or nipple, connecting a filling hose, setting performance parameters of the servicing equipment, opening and closing a fill/drain valve, manual observation of the process, disconnecting the filling hose and closing the nipple protection cap and the service panel flap. Likewise, removing waste from a waste tank requires multiple steps to be performed by the ground staff, including (among others) opening a service panel flap, opening a waste nipple protection cap, connecting a waste removal hose, setting performance parameters of the servicing equipment, opening and closing a waste valve, manual observation of the process, disconnecting the waste removal hose and closing the nipple protection cap and the service panel flap.

Moreover, filling potable water into a corresponding tank of the aircraft during servicing of the aircraft is usually performed until the tank overflows, which can be easily recognized by the ground staff as water runs out of an overflow port. However, this overflow (spilling of water) may cause unwanted situations, particularly, in cold weather conditions due to freezing water in the surrounding of the aircraft, as well as on a service unit.

SUMMARY OF THE INVENTION

It is therefore an object of the present disclosure to improve servicing of an aircraft, particularly servicing the aircraft with respect to a water supply and waste removal.

According to a first aspect to better understand the present disclosure, a method for servicing an aircraft by a ground service unit comprises reading a wireless parameter signal from a transponder at the aircraft, decoding the wireless parameter signal to derive at least one aircraft parameter of a water supply system and/or a waste system of the aircraft, moving a servicing equipment interface to a service panel of the aircraft, connecting the servicing equipment interface to a coupling at the service panel, servicing the aircraft via the servicing equipment interface corresponding to the at least one parameter, and writing at least one service parameter into the transponder at the aircraft.

Deriving the at least one aircraft parameter in a wireless manner allows preparing the ground service unit for servicing the aircraft in advance. As a mere example, the ground service unit may be informed about the type of aircraft, or a required amount of potable water, or an amount of waste to be removed from the aircraft. This allows planning the servicing of the aircraft in advance. Such planning includes managing the ground service unit or a plurality of ground service units to service at least one aircraft, for example, by providing sufficient potable water for more than one aircraft without refilling a tank of the ground service unit, or having enough storage volume for waste to remove the waste from one or more aircraft. This saves time and optimizes overall servicing tasks.

In general, all ground servicing activities at an airport may be coordinated in a better manner, as information about the servicing requirements can be received in a wireless fashion directly from the aircraft/s to be serviced.

Moreover, receiving and decoding the wireless parameter signal before moving the servicing equipment interface to the aircraft further facilitates servicing of the aircraft. For instance, if the requirements for the servicing are known to the ground service unit or the staff operating the ground service unit in advance, the servicing itself can be optimized, particularly the time for servicing can be optimized. As a mere example, loading and unloading of the ground service unit can be planned and optimized for the aircraft to be serviced and/or for all aircraft to be serviced at an airport.

Writing at least one service parameter into the transponder by the ground service unit further facilitates automation and better coordination of aircraft servicing. For instance, the aircraft personal, such as a cabin crew member and/or the pilot, may verify and/or confirm that servicing has been completed, since the corresponding service parameter/s (information) is stored in a component of the aircraft, i.e., the transponder installed in the aircraft.

In an implementation variant, the method can further comprise locating the coupling of the aircraft using the wireless parameter signal from the transponder. For example, the transponder, i.e., the source of the wireless signal, may be located by corresponding techniques, such as triangulation (e.g., using a plurality of antennas receiving the wireless signal from the transponder), determination of a strength of signal, or the like. Moreover, the transponder may be configured to transmit the wireless parameter signal as a beacon or to transmit a separate beacon, which is determinable by the ground service unit, e.g., the servicing equipment or servicing equipment interface of the ground service unit. Thus, by following the beacon and/or approximating the source of the beacon, i.e., the transponder, the ground service unit can move to the service panel of the aircraft.

In a further implementation variant, locating the coupling or the service panel can further comprise image recognition. For example, the ground service unit can use image recognition to recognize the aircraft type and then navigates the servicing equipment interface (or itself, as is described further below) to the service panel position. Usually a certain type of aircraft always has the service panel in the same position, which can be inherent information to the ground service unit. Alternatively or additionally, image recognition may further allow reading the aircraft's identification and determining the service panel position via a database. Thereafter, navigating the servicing equipment interface or the ground service unit can be performed depending on other distinctive components such as wings, empennage, landing gear, etc. Moreover, image recognition can facilitate to avoid collision with the aircraft, other ground service vehicles or people.

In yet a further implementation variant, image recognition can be employed to identify an abnormal service panel condition (e.g., damage). Such abnormal condition can trigger generation and transmission of an error message to the ground control center.

In another implementation variant, locating the coupling or the service panel can further comprise sensing and evaluating optical signals, e.g., light signals, particularly infrared signals, acoustic signals, radar signals, or combinations of the above mentioned signals.

Any of such locating further allows even autonomous moving of the ground service unit around the aircraft. Particularly, the ground service unit can be configured to move to the service panel or at least in its vicinity without staff. Since the transponder and/or image recognition and/or signal evaluation further facilitates locating the coupling, the servicing equipment or servicing equipment interface may alternatively or additionally be autonomously or automatically moved. As a mere example, the wireless parameter signal may further include information about a position of the coupling, such as a relative position between the transponder and the coupling. Thus, the servicing equipment interface may be moved to the coupling also in an autonomous manner, i.e., without the necessity of ground staff moving the servicing equipment interface.

In another implementation variant, the moving to the service panel can comprise moving the ground service unit in proximity to the service panel and moving the servicing equipment interface with a service robot arm to the service panel and the coupling. Alternatively, the ground service unit is fixed and comprises the service robot arm, or the ground service unit forms part of another fixed or mobile airport structure, such as a passenger bridge, lamp post or the like, or the ground service unit is built subsurface in the apron, where the robot arm is extendible and retractable from/in the apron. All such moving tasks can be performed autonomously based on the transponder signal or the further locating techniques. This saves time and allows (semi-) automation of servicing of the aircraft. The moving of the ground service unit can be performed by a drive unit, for example, operating at least one drive wheel or axle, while moving the servicing equipment interface is achieved by the service robot arm, such as a multi-axle robot arm capable of reaching any position in a three-dimensional space. Moving in proximity to the service panel may include moving the ground service unit and/or servicing equipment interface in a range between 50 cm and 10 meters away from the service panel, while the robot arm can be configured to span the distance between the ground service unit and the service panel.

In yet another implementation variant, the robot arm and/or the servicing equipment interface can be configured to perform adjustment movements. For example, the aircraft or portion of the aircraft containing the aircraft service panel may move (e.g., oscillate) due wind, a person walking along an aircraft aisle, loading/unloading the cabin or cargo area, or the like. By employing the above described locating (localization) techniques, any movement of the service panel position/coupling position can be identified and compensated for.

In a further implementation variant, the at least one aircraft parameter can comprise a fill level of a water tank of the water supply system, an indication to drain the water tank, a required fill level of the water tank, a maximum allowed filling pressure of the water supply system, a maximum tank volume of the water tank, a fill level of a waste tank of the waste system, a maximum tank volume of the waste tank, a rinse fluid type for the waste tank, a required minimum rinse time for the waste tank, a maximum allowed rinsing pressure of the waste system, a pre-charge fluid type for the waste tank, and/or a pre-charge fluid volume for the waste tank.

In other words, with respect to a (potable) water tank of the aircraft, the aircraft parameter can specify a current fill level or a fill level before the aircraft is powered down. This allows determination of a required amount of water for filling the water tank, for example, if the size of the water tank and/or the type of the aircraft is known. The indication to drain the water tank can be a simple Boolean variable, for example, set by an aircraft system and/or the pilot or other staff of the aircraft. The required fill level, maximum allowed filling pressure, and maximum tank volume may further facilitate filling the right amount of potable water into the water tank, without the necessity of overfilling the tank. This does not only avoid water spilling out at the service panel or another overflow port, but further facilitates automation of the filling process, as a pump may be stopped or a filling valve may be closed after the required fill level has been reached.

Likewise, the information about the waste tank provided with the at least one aircraft parameter allows automation as well as optimization of waste removal from the aircraft.

Alternatively or additionally, the at least one aircraft parameter can comprise an aircraft identification, an aircraft servicing requirement indication, and/or a position information of the service panel. The aircraft identification allows deriving aircraft specific information, e.g., about the service panel (location), the water/waste tank/s, etc. This further facilitates automation of the aircraft servicing tasks.

In yet a further implementation variant, the at least one service parameter can comprise an identification of the ground service unit, a timestamp, a water service confirmation, a filled water volume, a drained water volume, a waste service confirmation, a drained waste volume, a rinse fluid type for the waste system, a rinse fluid volume for the waste system, and/or a pre-charge volume for a waste tank of the waste system. Thus, all information necessary to confirm that the servicing is completed is stored in the aircraft, particularly in the transponder installed in the aircraft.

According to a second aspect to better understand the present disclosure, an aircraft service panel comprises a fill and drain coupling configured to be connected to a servicing equipment interface, a fill and drain valve configured to open and close a fluid connection between the fill and drain coupling and a fill and drain pipe, and a transponder configured to store water supply data indicating at least one aircraft parameter of a water supply system, to transmit the stored water supply data, and to generate a location signal identifying a position of the transponder and/or a position of the fill and drain coupling.

Alternatively, an aircraft service panel is provided for other systems of an aircraft requiring ground servicing, such as a waste system, a fuel system, a ground power connection, a cargo loading facility, or a ground air supply. In such cases, the aircraft service panel comprises a corresponding coupling configured to be connected to a servicing equipment interface, a valve or switch configured to admit or restrict a connection between the coupling and a servicing equipment pipe or line, and a transponder configured to store waste or supply data indicating at least one aircraft parameter of the respective system, to transmit the stored waste or supply data, and to generate a location signal identifying a position of the transponder and/or a position of the coupling.

Providing the aircraft service panel with a transponder transmitting the (water) supply data and the location signal does not only allow planning and facilitating aircraft servicing, but also allows an at least semi-autonomous servicing of the aircraft due to the position identification of the (fill and drain) coupling. For instance, a servicing equipment may be configured to determine the location/position of the transponder and, hence, the location of the (fill and drain) coupling, so that an automatic connection between the servicing equipment interface and the coupling can be performed.

Additionally or alternatively, the location signal can further allow identifying the position of the (waste or other) coupling. For instance, a relative location between the transponder and the (waste or other) coupling may be determined by the servicing equipment (or servicing equipment interface) or may be derived from the data transmitted by the transponder.

In another implementation variant, the aircraft service panel can further comprise a service panel control configured to operate at least the fill and drain valve. The service panel control can be configured to determine whether a servicing equipment interface is coupled to the fill and drain valve, for example, by employing associated sensors. If a fluid tight coupling between servicing equipment interface and fill and drain valve (via the coupling) has been determined (and verified), the service panel control may open the fill and drain valve for draining water from a water tank and/or filling a water tank via the servicing equipment and servicing equipment interface.

Additionally or alternatively, the transponder can be further configured to receive a control signal to open or close the fill and drain valve. For instance, the servicing equipment (or servicing equipment interface) may be configured to transmit a signal to open or close the fill and drain valve, such as a wireless signal. The transponder can then act as a receiver of such signal. As a mere example, the transponder can be connected to the service panel control and can be configured to send a corresponding open/close signal to the service panel control depending on the reception of the signal from the servicing equipment (or servicing equipment interface).

Also additionally or alternatively, the service panel can comprise a manually operable lever to open and close the fill and drain valve. The ground service unit may then be configured to operate the lever for automatic draining water from a water tank and/or filling a water tank.

It is to be understood that the coupling(s) and/or manually operable lever and other control elements of the service panel are configured to be used by legacy service units, for example, at airports not having robotic servicing equipment.

In yet another implementation variant, the transponder can comprise a passive radio-frequency identification, RFID, tag configured to store data, to transmit the stored data when powered by an RFID reader, and to generate a radio-frequency location signal. Such an RFID tag can be used even if the aircraft is powered down. In addition, an RFID tag allows transmission of the stored data and/or location signal at least in a near field communication area (e.g., up to 10 m). This distance is sufficient for a ground service unit and/or servicing equipment interface to communicate with the transponder before moving to the service panel.

Alternatively or additionally, the transponder can comprise an active RFID tag configured to store data, to transmit the stored data when activated by a power supply, and to generate a radio-frequency location signal. The power supply may be part of a power generator of the aircraft, so that the active RFID tag is capable of transmitting data and the location signal as long as the aircraft is under power. Alternatively or additionally, the power supply may be an individual power supply for the active RFID tag, so that the data and location signal can be transmitted independent of an aircraft power, i.e., even if the aircraft is powered down.

Such active RFID tag allows near field communication as well as far field communication (e.g., up to 150 m). Such far field communication allows receiving and evaluating data from the aircraft even before servicing is planned. As a mere example, a ground service control center or a ground service unit may communicate with the aircraft (the active transponder) to determine which services are required and which servicing equipment, servicing equipment interface and materials have to be dealt with. For instance, the amount of potable water to be filled into a water tank of the aircraft as well as the amount of waste to be removed from the aircraft may be determined first, and the type of servicing equipment, servicing equipment interface and/or ground service unit is then specified on the basis of this information.

In a further implementation variant, the RFID tag can be configured to store different data types, such as static data and dynamic data. While the static data can be aircraft specific constants and are pre-stored in the RFID tag, the dynamic data can be written regularly to the transponder (i.e., the RFID tag). The dynamic data, for example, can comprise the at least one aircraft parameter of the water supply system and/or the waste system of the aircraft.

According to a third aspect to better understand the present disclosure, an aircraft comprises an aircraft service panel of the second aspect or one of its variants, at least one water tank configured to store water, the at least one water tank being fluidly connected to the fill and drain pipe of the aircraft service panel. Thus, the aircraft service panel of the second aspect is employed for servicing the aircraft, particularly, draining water from the water tank as well as filling the water tank.

Alternatively or additionally, the aircraft can further comprise at least one waste tank configured to store waste, the at least one waste tank being fluidly connected to the waste pipe of the aircraft service panel. Likewise, the aircraft service panel of the second aspect is employed for servicing the aircraft, particularly, removing waste from a waste tank of the aircraft.

Also alternatively or additionally, the aircraft can further comprise an RFID reading/writing device configured to at least store the water supply data in the transponder of the aircraft service panel. This allows storing information about the water supply (as well as other data) in the transponder, for example, while the aircraft is powered. Independent of the power supply of the aircraft, the transponder can then transmit the stored data, for example, to a ground service unit or other servicing equipment.

In an implementation variant, the aircraft can further comprise an aircraft data network configured to request data indicating at least one parameter of the at least one water tank and to transmit the requested data to the RFID reading/writing device for storing the at least one parameter as water supply data in the transponder. For example, the requested data may be a sensor signal or sensor data indicating a water level in the water tank and/or a pre-selection level input at an input interface by an aircraft staff (i.e., an amount of water to be filled during servicing of the aircraft). The storing of the at least one parameter in the transponder can be performed in regular intervals, to keep the data stored in the transponder up-to-date.

As a mere example, the at least one parameter of the at least one water tank can comprise a fill level of the at least one water tank, an indication to drain the water tank, a required fill level of the water tank, a maximum allowed filling pressure of the water tank, and/or a maximum tank volume of the water tank. Thus, servicing of the aircraft can be facilitated by providing the information necessary for the grant service unit. The indication to drain the water tank may be a Boolean variable indicating to the ground service unit whether any remaining water in the water tank shall be drained before (re-)filling the tank.

In another implementation variant, the aircraft data network can be further configured to request data indicating at least one parameter of the at least one waste tank and to transmit the requested data to the RFID reading/writing device for storing the at least one parameter as waste data in the transponder. Thus, as with the data on the water tank, the transponder may be used to store and provide data about waste collected in the aircraft. The storing of the at least one parameter in the transponder can be performed in regular intervals, to keep the data stored in the transponder up-to-date.

As a mere example, the at least one parameter of the at least one waste tank comprises a fill level of the waste tank, a maximum tank volume of the waste tank, a rinse fluid type for the waste tank, a required minimum rinse time for the waste tank, a maximum allowed rinsing pressure of the waste tank, a pre-charge fluid type for the waste tank, and/or a pre-charge fluid volume for the waste tank.

According to a fourth aspect to better understand the present disclosure, an aircraft servicing system comprises an aircraft according to the third aspect or one of its variants, and a ground service unit comprising a servicing equipment configured to control servicing the aircraft and a servicing equipment interface configured to connect to the fill and drain coupling of the aircraft service panel of the aircraft.

In an implementation variant, the ground service unit can be configured to perform the method according to the first aspect or one of its variants.

As a mere example, the ground service unit can comprise at least one of a drive unit to move the ground service unit, e.g., in proximity to the aircraft service panel, a robot arm coupled to the servicing equipment interface and configured to move the servicing equipment interface to the aircraft service panel, an RFID reading unit configured to read the water supply data and/or the location signal transmitted by the transponder of the aircraft service panel, an RFID writing unit configured to write at least one service parameter into the transponder of the aircraft service panel, and a service unit controller configured to control the servicing equipment and the servicing equipment interface to service the aircraft. The drive unit may be configured for autonomous driving of the ground service unit, for example on the basis of sensor signals, such as one or more image sensors and/or cameras providing information about a surrounding of the ground service unit.

Alternatively, the ground service unit is fixed and comprises the service robot arm, or the ground service unit forms part of another fixed or mobile airport structure, such as a passenger bridge, lamp post or the like, or the ground service unit is built subsurface in the apron, where the robot arm is extendible and retractable from/in the apron.

In another implementation variant, the servicing equipment of the ground service unit may comprise at least one tank, pump or conveying device, a hose, monitoring device, controller, etc., i.e., equipment necessary to perform the service of the aircraft. The servicing equipment interface can be an interface or coupling configured to be coupled to the coupling of the aircraft service panel. It is to be understood that the hose may also be considered as forming part of the servicing equipment interface, since it can be moved relative to the main body of the ground service unit usually containing the servicing equipment like the servicing equipment interface is also moved relative to the main body of the ground service unit.

In yet another implementation variant, the ground service unit can further be equipped with sensors configured to determine the location and position of the aircraft service panel and/or components of the aircraft service panel, such as the fill and drain coupling and/or the waste or other coupling. Such sensors can comprise an image sensor, a camera, a proximity sensor, etc. This allows a fine adjustment for the robotic, i.e., the robot arm comprising the servicing equipment interface. In other words, a service unit controller can be configured to control the robot arm, such as moving the robot arm and, hence, the servicing equipment interface based on the location signal received from the transponder and further on the basis of the sensor's signals, particularly, once the servicing equipment interface is close to the aircraft service panel.

Furthermore, the robot arm may further be configured to open and close a flap of the aircraft service panel. For instance, the robot arm may be equipped with a tool for opening and closing the flap. The tool may comprise a key, pin or the like.

The servicing equipment can comprise a hose for water as well as for waste. The hose being coupled to the servicing equipment interface which actually couples to the coupling of the service panel. For hygienic reasons, the hose and interface for water is different from the hose and interface for waste. The robot arm can be configured to (individually) move the hose and servicing equipment interface, in order to connect the interface to the respective coupling at the aircraft service panel.

In yet another implementation variant, the aircraft servicing system can further comprise a ground service control center configured to communicate with the aircraft and the ground service unit, and further configured to control movement of the ground service unit and/or the servicing equipment interface and control servicing of the aircraft by the ground service unit. In other words, the ground service control center controls the ground service unit or a plurality of ground service units, in order to service one or more aircraft. The ground service control center may also perform overall control of autonomous servicing of aircraft, such as communicating data and location information between aircraft and ground service units.

For example, the ground service control center may receive data from the transponder of the service panel of an aircraft either directly via wireless communication or indirectly via a ground service unit. The ground service control center can be configured to evaluate the data received from several transponders, i.e., several aircraft, in order to optimize servicing of the aircraft. Thus, the ground service control center can optimize different tasks to be performed during servicing of the aircraft, such as delivering water to a plurality of aircraft without refilling a tank of a ground service unit. For instance, if some aircraft do not require a full re-fill of the respective water tank, a ground service unit may carry enough water for all of these aircraft and can perform filling one aircraft after the other without moving back to a water supply station.

Moreover, the ground service control center is capable of communicating with a plurality of aircraft, and can organize autonomous servicing of any aircraft in dependence on a parking position of the aircraft, respective service requirements (amount of water to be drained, amount of water to be filled, amount of waste to be removed, maximum allowed filling/rinsing pressure, regular time to perform each servicing task, etc.), availability of ground service units and the like.

The ground service control center can be configured to decide autonomously, which tasks are to be performed at which aircraft. Alternatively or additionally, such decisions may be made or influenced manually, i.e., by an operator of the ground service control center. The ground service control center, therefore, can be provided with a corresponding logic.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
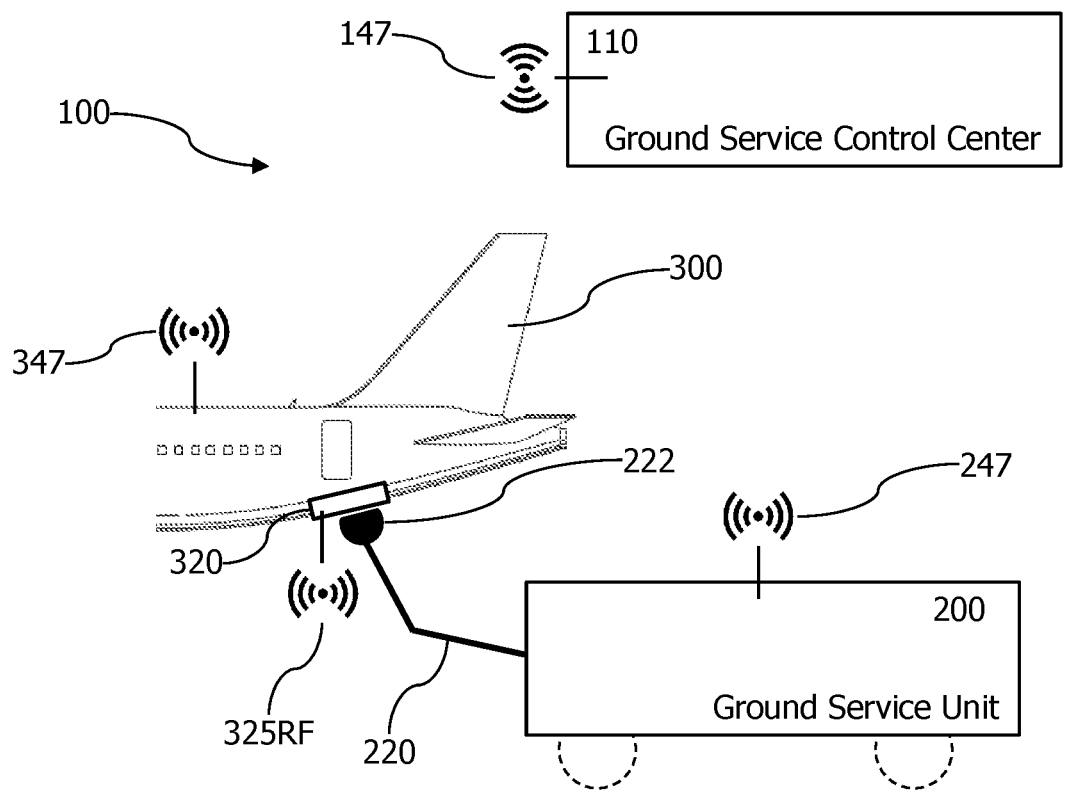
FIG. 1 schematically illustrates an aircraft servicing system.

FIG. 1 schematically illustrates an aircraft servicing system 100 comprising a ground service control center 110, at least one (fixed or mobile) ground service unit 200, and at least one aircraft 300. The ground service control center 110 can be understood as an overall controller center 110 for an airport or at least a portion of an airport, such as a number of gates. The ground service control center 110 can be configured to coordinate servicing of one or more aircraft 300 and via one or more ground service units 200.

The actual servicing is performed by the one or more ground service units 200 that are capable of driving/moving around on the airport and particularly driving to one of the aircraft 300. Alternatively, at least some of the one or more ground service units 200 can be fixed and comprise (only) a service robot arm 220, or the ground service unit forms part of another fixed or mobile airport structure (not illustrated), such as a passenger bridge, lamp post or the like, or the ground service unit is built subsurface in the apron (not illustrated), where the robot arm 220 is extendible and retractable from/in the apron. The ground service unit 200 is equipped with a servicing equipment interface 222 that is movable by a robot arm 220, and which can be coupled to an aircraft service panel 320 of the aircraft 300. For instance, the aircraft service panel 320 may comprise a coupling 321, 327 (FIG. 5) or the like, through which the ground service unit 200 can provide any supply to the aircraft 300 or remove any item or liquid from the aircraft 300.

In general, wireless communication can take place between the ground service control center 110, the ground service unit/s 200 and the one or more aircraft 300. For instance, the entities of the aircraft servicing system 100 can be equipped with a respective wireless communication component 147, 247, 347. These components may communicate based on a standard technology, such as Wi-Fi, Bluetooth, 3G, 4G, 5G, data radio, far field communication and near field communication.

In addition, the aircraft 300 can be equipped with at least one transponder 325 configured to store data indicating at least one aircraft parameter and to transmit the stored data in a wireless signal 325RF. The transponder 325 and its functionality will be explained in more detail with respect to FIGS. 4 and 5.

Figure 2:
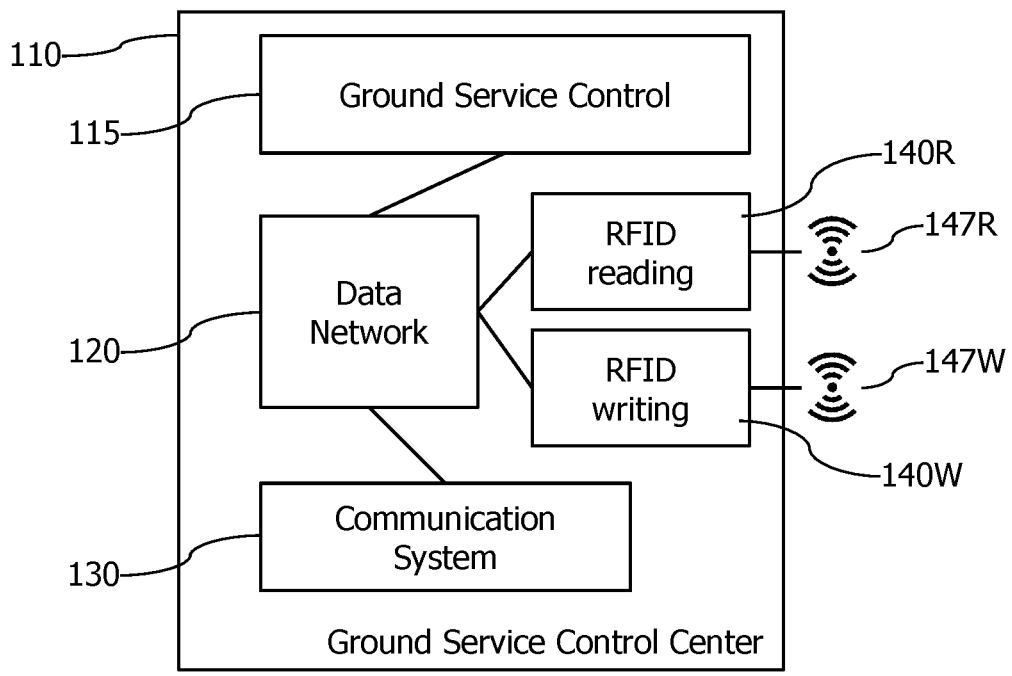
FIG. 2 schematically illustrates a ground service control center.

FIG. 2 schematically illustrates a ground service control center 110 in more detail. The control center 110 may comprise a ground service control 115 that can be a controller or other dedicated processor for the overall control of control center 110. The control center 110 further comprises a data network 120 and a communication system 130. For example, the communication system 130 may comprise a wireless communication unit 147 (FIG. 1) for general far field communication between entities of the system 100. The data network 120 can be configured to communicate between ground service control 115 and the communication system 130, such as a bus or similar data exchange system.

The ground service control center 110 can further include an RFID component 140, such as an RFID component 140 for reading and writing data from an RFID tag. As a mere example, the control center 110 can comprise an RFID reading unit 140R for reading data from any RFID tag, and can further comprise an RFID writing unit 140W for writing data to any RFID tag. The RFID component 140 of the ground service control center 110 can be configured to communicate with an RFID tag located anywhere at the airport or the at least a portion of the airport covered by the ground service control center 110. For instance, the RFID component 140 may be implemented as a far field communication system.

As illustrated in FIG. 2, the RFID reading and writing units 140R, 140W are configured to provide far field communication and/or near field communication, indicated as 147R for reading and 147W for writing data from and to an RFID tag. As a mere example, such communication 147R, 147W may take place between the ground service control center 110 and an RFID tag 325 of an aircraft 300. For instance, if an aircraft arrives at an airport, the ground service control center 110 can use far field communication to read out data from the RFID tag 325 of the aircraft 300. Such communication may take place even while the aircraft 300 is taxiing or moving on the aircraft field, i.e., before it comes to a parking position (gate).

Figure 4:
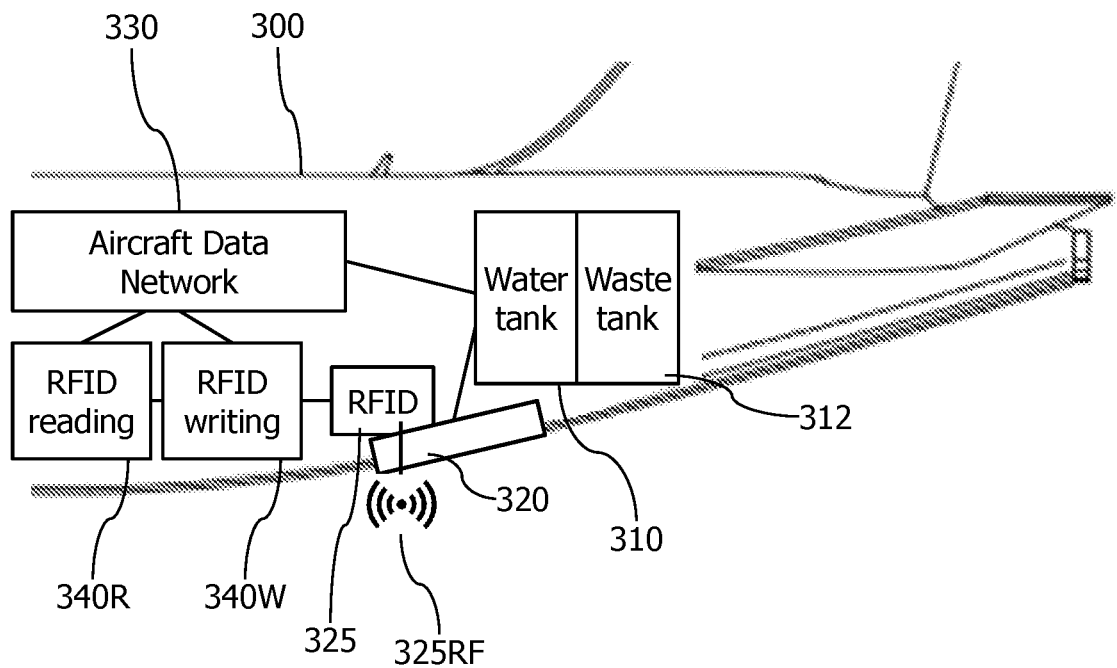
FIG. 4 schematically illustrates a portion of an aircraft.

The data received from the RFID tag 325 may comprise (among others) at least one aircraft parameter, such as a parameter of a water supply system 310 and/or waste system 312 (FIG. 4). The ground service control center 110 may then coordinate servicing of the aircraft 300 on the basis of the received parameter/s. For instance, the ground service control center 110 may evaluate whether and/or when a ground service unit 200 is available for servicing the aircraft 300. In addition, the ground service control center 110 may ensure that a ground service unit 200 is equipped with material and/or components allowing servicing of the aircraft 300. As a mere example, the ground service unit 200 may store potable water in a tank to provide the water to the aircraft 300, and/or may empty a waste tank in the ground service unit 200 to provide sufficient empty waste tank volume to receive waste from the aircraft 300 as will be explained in more detail below.

It is to be understood that the data from the RFID tag 325 of the aircraft 300, i.e., the transponder 325 of the aircraft 300, may be, additionally or exclusively, received at the ground service control center 110 via a different communication technique, such as Wi-Fi, Bluetooth, 3G, 4G, 5G, data radio, far field communication and near field communication. For example, if the RFID reading unit 140R cannot receive the signal of the transponder 325, data can already be exchanged between the ground service control center 110 and the aircraft 300 using the different communication technique.

Figure 3:
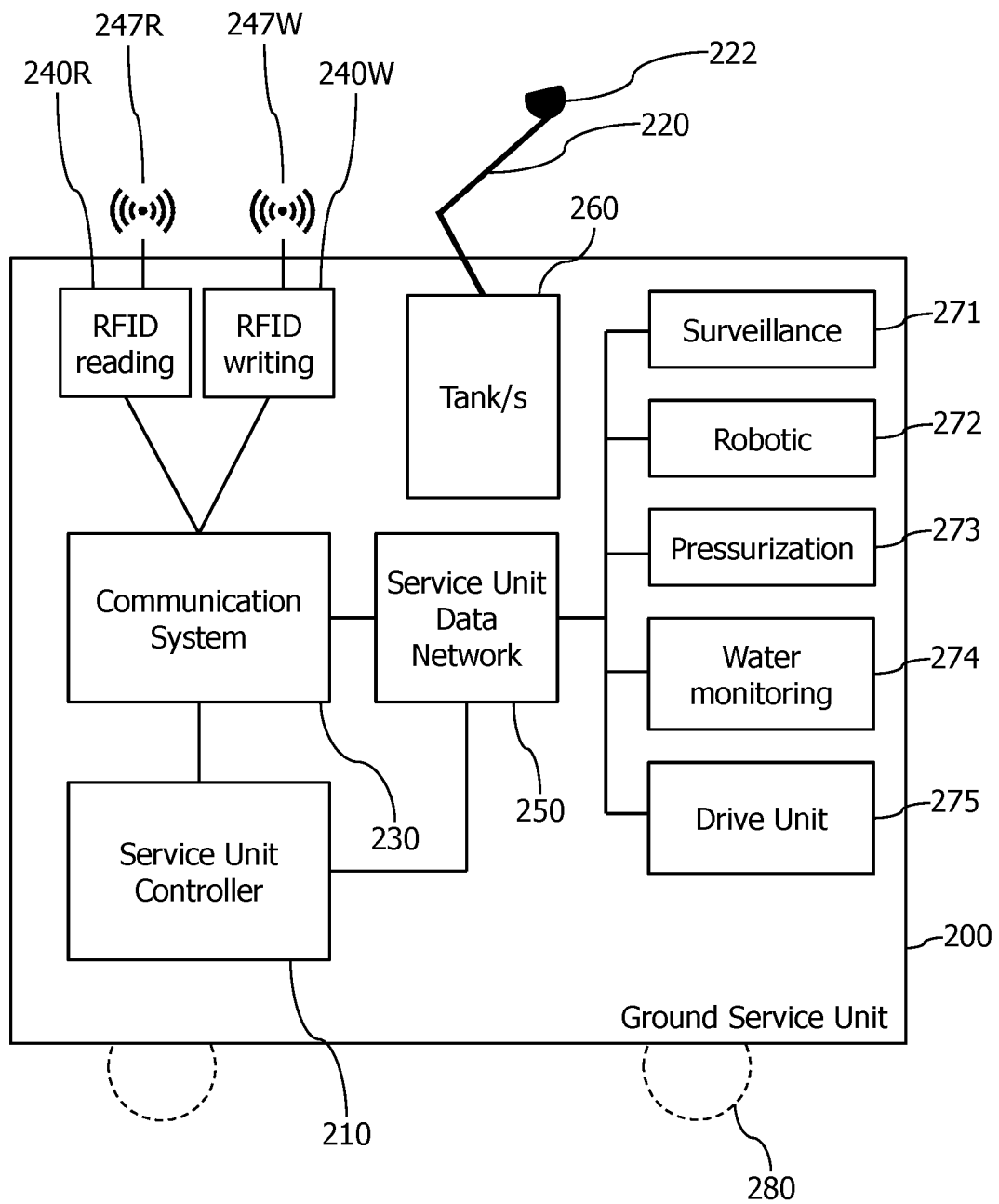
FIG. 3 schematically illustrates a ground service unit.

FIG. 3 schematically illustrates a ground service unit 200, which may be configured to drive around an airport field, particularly move to an aircraft 300 for servicing. The ground service unit 200 may comprise a drive unit 275 as well as one or more drive wheels 280. In other words, the ground service unit 200 can be a vehicle that can be driven by a ground staff or autonomously based on control signals from a service unit controller 210 and/or the drive unit 275.

Alternatively, the ground service unit 200 is fixed. Therefore, the wheels 280 are drawn in dashed lines. Such ground service unit 200 can comprise the service robot arm 220, or the ground service unit 200 forms part of another fixed or mobile airport structure (not illustrated), such as a passenger bridge, lamp post or the like, or the ground service unit 200 is built subsurface in the apron, where the robot arm 220 is extendible and retractable from/in the apron.

The ground service unit 200 may comprise a service unit data network 250 as well as a communication system 230, which allows far field and near field communication with the ground service control center 110 and/or the aircraft 300. The ground service unit 200 may further comprise RFID units 240, which can be configured in the same manner as RFID units 140 of ground service control center 110.

The ground service unit 200 further comprises at least one tank 260 and the robot arm 220. The at least one tank 260 can store water to be supplied to an aircraft 300 or can store waste removed from the aircraft 300. The robot arm 220 can be configured to move towards an aircraft 300, particularly an aircraft service panel 320 to establish a fluid connection between a water or waste tank 310, 312 of the aircraft 300 and the at least one tank 260 of the ground service unit 200. This connection will be explained in more detail with respect to FIG. 5. The robot arm 220 holds a servicing equipment interface 222 and is configured to move the servicing equipment interface 222 towards the aircraft service panel 320.

Figure 5:
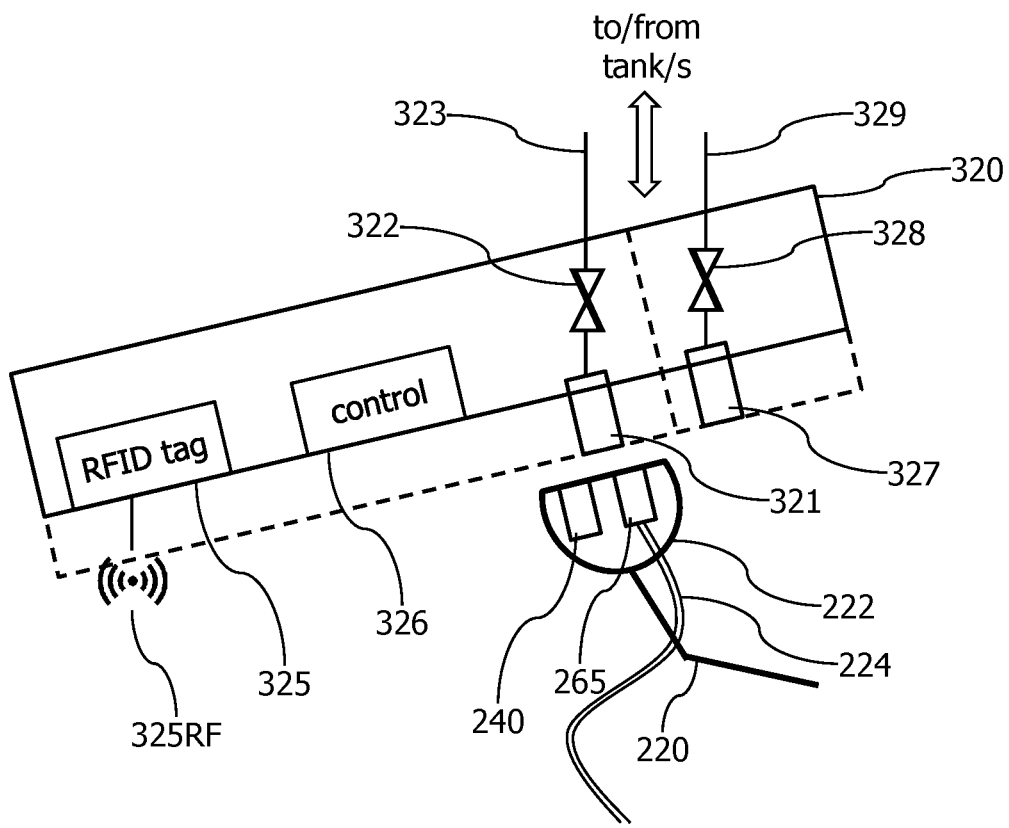
FIG. 5 schematically illustrates an aircraft service panel.

The ground service unit 200 can further comprise a surveillance unit 271 configured to survey a surrounding (vicinity) of the ground service unit 200. The surveillance unit 271 may be responsible for identifying an object in the surrounding of the ground service unit 200, which allows autonomous driving of the ground service unit 200 via drive unit 275. The surveillance unit 271 may further be employed to identify the location of the aircraft service panel 320 and/or any entity of the aircraft service panel 320, such as a coupling 321, 327 (FIG. 5). This allows facilitating movement of the robot arm 220 and particularly the servicing equipment interface 222 and the coupling of the servicing equipment interface 222 with the coupling 321, 327 of the aircraft service panel 320.

As a mere example, locating the service panel 320 or the coupling 321, 327 (i.e., identifying its position) can further comprise image recognition, for example, performed by the surveillance unit 271 by using one or more image sensors (not illustrated). A further possibility of locating the service panel 320 or the coupling 321, 327 may comprise sensing and evaluating optical signals, e.g., light signals, particularly infrared signals, acoustic signals, radar signals, or combinations of the above mentioned signals. The corresponding sensors (not illustrated) may be installed at the robot arm 220, at the servicing equipment interface 222 and/or at a main body of the ground service unit 200.

Furthermore, the ground service unit 200 can comprise a robotic unit 272, which may control and coordinate the robot arm 220. The robotic unit 272 may be configured to evaluate sensor signals identifying the aircraft 300, the aircraft service panel 320, couplings 321, 327 at the aircraft service panel 320 and the like, in order to facilitate and speed-up servicing of the aircraft. Such sensor signals may be provided by the surveillance unit 271, e.g., (pre-)processed by the surveillance unit 271.

A pressurization unit 273 may pressurize water in the at least one tank 260. For instance, the pressurization unit 273 can be a conveying device (such as a pump, displacement pump, compressor or the like) conveying water from tank 260 towards the aircraft 300. The pressurization unit 273 may develop a pressure within tank 260, so that water stored in the tank 260 is pressed out towards the aircraft 300. Alternatively, the pressurization unit 273 may generate a vacuum (negative pressure), in order to remove waste from the aircraft 300.

Servicing the aircraft 300 further requires a monitoring of the water in the ground service unit 200, for example, by water monitoring unit 274. This water monitoring unit 274 may be configured to sense or determine a water level in the water tank 260, for example, in order to determine whether enough water is present in the ground service unit 200 for fulfilling the next servicing task. The water monitoring unit 274 can further be configured to calculate a volume of water filled into the water tank 310 of the aircraft 300. To do so, the water monitoring unit 274 may comprise or be connected to a flow sensor. Alternatively or additionally, the water monitoring unit 274 may calculate the volume of water filled into the aircraft 300 by taking the time of operating the pressurization unit 273.

In any case, the service unit controller 210 can be configured to communicate with the surveillance unit 271, the robotic unit 272, the pressurization unit 273, the water monitoring unit 274 as well as the drive unit 275, in order to control the overall servicing of the ground service unit 200. As a mere example, the service unit controller 210 may operate the pressurization unit 273 on the basis of at least one signal derived from the water monitoring unit 274.

FIG. 4 schematically illustrates a portion of an aircraft 300 comprising an aircraft service panel 320. The service panel 320 will be explained in more detail with respect to FIG. 5 and serves as an interface, for example, to a water tank 310 and/or a waste tank 312. It is to be understood that a water supply system comprising the water tank 310, as well as a waste removal system comprising the waste tank 312, form part of the aircraft 300.

The aircraft 300 comprises an aircraft data network 330 configured to communicate between different components of the aircraft 300. For example, a fill level of the water tank 310 and/or waste tank 312 may be determined, for example using corresponding sensors (not illustrated). The aircraft data network 330 may write corresponding water/waste level data into an RFID tag 325, for example, employing an RFID writing unit 340W. The RFID tag 325 can be installed anywhere at the aircraft 300, and is preferably installed at, in or in proximity to the aircraft service panel 320.

Thus, any RFID reading unit (such as RFID reading unit 340R of the aircraft (controlled via aircraft data network 330), RFID reading unit 147R of the ground service control center 110 and RFID reading unit 247R of the ground service unit 200) can generate an electromagnetic wave (e.g., directed to the RFID tag 325), so that the RFID tag 325 generates and transmits a data signal 325RF. In other words, RFID tag 325 is configured to operate as a transponder 325 configured to store data indicating at least one aircraft parameter, and to transmit the stored data. Alternatively or additionally, the transponder 325 can be an active RFID tag that can transmit the stored data independent of an electromagnetic wave hitting the RFID tag 325.

The RFID tag 325 can be considered as a storage device and transponder configured to communicate with servicing equipment, such as ground service unit 200, independent of a power supply from the aircraft 300. The RFID tag 325 may store different types of data, including static data and dynamic data, which can be read out by an RFID reader. Some of these data types, i.e., aircraft parameters, are exemplarily listed in Table 1:

TABLE 1 possible data types stored in and derivable from RFID tag 325

| Description | Data Type | Rational |
| --- | --- | --- |
| General data | | |
| Aircraft identification (Aircraft Type/Family/MSN/FSN/Tail-Number) | static | Accounting of services Yes/no decision for service company (e.g. to refuse unwanted customers) |
| Boolean operator to enable/disable servicing | dynamic | Avoiding unwanted servicing (e.g. at airports with low water quality or during maintenance activities) |
| Water system specific data | | |
| Service panel position | static | Navigation data for autonomous service vehicle/robotic |
| Water tank configuration | static | Maximum tank volume |
| Last tank filling level before power down | dynamic | Draining: Required service truck capacity to collect drained water Filling: To calculate required delta for filling |
| Maximum allowed filling pressure valve | static | Set filling pressure |
| Pre selection level | dynamic | Required filling volume |

TABLE 1-continued possible data types stored in and derivable from RFID tag 325

| Description | Data Type | Rational |
| --- | --- | --- |
| Waste system specific data | | |
| Service panel position | static | Navigation data for autonomous service vehicle/robotic |
| Waste tank configuration | static | Maximum tank volume |
| Last tank filling level before power down | dynamic | Required service truck capacity |
| Rinse fluid type | dynamic | Water is standard for Airbus aircraft but other fluids are also possible |
| Rinse time | dynamic | Required rinse time for effective tank cleaning |
| Rinse pressure | dynamic | Required rinse pressure for or effective tank cleaning |
| Pre-charge fluid type | dynamic | Can be a parfume fluid like "blue juice" or any other pre-charge fluid |
| Pre-charge volume | dynamic | Pre-charging with fluid is aircraft and operator specific (for current airbus aircraft this is omitted) |

It is to be understood that the data stored by the RFID tag 325 may be communicated via different channels. For example, the aircraft data network 330 may access the data stored in the RFID tag 325 and communicate the same via the wireless communication component 347 of the aircraft 300.

For example, when aircraft parameters, such as data about the water tank 310 or waste tank 312, are read out by an RFID reading unit, such as RFID reading unit 247R of the ground service unit 200, the ground service unit 200 can be set for servicing the aircraft 300. This may take place in advance of servicing the aircraft 300, for example already when the aircraft 300 arrives at the airport via far field communication or when the aircraft 300 reaches or has reached a parking position via near field communication. The ground service unit 200 may be filled with enough water, for example, the maximum tank volume or the amount of water to achieve the pre-selection level (see Table 1 above). Alternatively, a ground service unit 200 is chosen for servicing the aircraft 300 that provides enough water, according to the associated aircraft parameter. It is to be understood that the same may be done on the basis of aircraft parameters concerning the waste system, such as a required service truck capacity (last waste tank filling level before power down in Table 1).

Turning to FIG. 5, the aircraft service panel 320 is illustrated in more detail together with the servicing equipment interface 222 of a ground service unit 200. The ground service unit 200 for servicing the aircraft 300 may have already been moved to the aircraft 300, and, particularly, in proximity to the service panel 320. A robot arm 220 may then move the servicing equipment interface 222 towards the aircraft service panel 320. This is facilitated by the RFID tag 325, particularly by generating a location signal identifying a position of the transponder 325 and/or a position of a fill and drain coupling 321 or waste coupling 327. Specifically, the RFID tag 325 can generate a location signal, such as a beacon, that allows determination of a location of the RFID tag 325.

For instance, an RFID unit 240 of the ground service unit 200, such as RFID reading unit 240R (FIG. 3), may be employed to identify the location signal and the source of such signal. As a mere example, the RFID reading unit 240 may be installed at or near the servicing equipment interface 222 and can be configured to identify a strength of the location signal in a vicinity of the servicing equipment interface 222. The robot arm 220 may then move the servicing equipment interface 222 closer to the location of the maximum strength of the location signal, until the servicing equipment interface 222 has reached the RFID tag 325.

The RFID tag 325 may further generate the location signal in such a manner that it provides information about a relative position of the coupling 321, 327 with respect to the RFID tag 325. This allows the ground service unit 200 to calculate a position of the coupling 321, 327, so that the robot arm 220 can move the servicing equipment interface 222 not to the position of the maximum strength of the location signal, but to the respective coupling 321, 327.

This process may be facilitated by additional proximity sensors (not illustrated or combined with RFID reading unit 240), a camera or other image capturing device. For example, additionally or alternatively, the robot arm 220 can move the servicing equipment interface 222 to the respective coupling 321, 327 with the aid of the surveillance unit 271 as explained above. In this case, the surveillance unit 271 may comprise one or more sensors (not illustrated, but arrangeable like RFID reading unit 240) sensing optical signals, e.g., light signals, particularly infrared signals, acoustic signals, radar signals, or combinations of these signals. On the basis of one or more of these signals, the (exact) location of the aircraft service panel 320 and/or coupling 321, 327 can be identified, which facilitates movement of the robot arm 220 and particularly steering the servicing equipment interface 222 for coupling with the coupling 321, 327.

Once the servicing equipment interface 222 has reached the coupling 321, 327, the robot arm 220 may move in such a manner that a water or waste coupling 265 of the servicing equipment interface 222 can be coupled to a fill and drain coupling 321 or a waste coupling 327, depending on whether servicing is performed with respect to providing potable water to the aircraft 300 or removing waste from the aircraft 300. During the respective service, water is provided through a hose 224 to the water coupling 265 of the ground service unit 200, for example from tank 260 supported by pressurization unit 273. Alternatively, waste is removed from waste tank 312 through a hose 224 into a corresponding tank 260 of the ground service unit 200.

FIG. 5 illustrates both couplings 321, 327 for water as well as waste separated by a dashed line. It is to be understood that for hygienic reasons, a service panel 320 should not include both couplings 321, 327. Rather, different service panels 320 should be installed at the aircraft 300, one with the water coupling 321 and another one with the waste coupling 327.

The servicing may further include opening a fill and drain valve 322 of the aircraft service panel 320, so that a fluid connection between the fill and drain coupling 321 and a fill and drain pipe 323 leading to the water tank 310 is achieved. The opening of the fill and drain valve 322 may be under control of the controller 326 of aircraft service panel 320. Alternatively, the valve 322 may be controlled by the aircraft data network 330, for example, if the aircraft 300 is (still) powered on.

The control of the fill and drain valve 322 may also be under commands from the ground service unit 200, for example, from service unit controller 210. This may be achieved by providing a corresponding command signal from the RFID unit 240 of the ground service unit 200 to the RFID tag 325. As a mere example, the RFID writing unit 240W of the ground service unit 200 may be used to write a corresponding command data into the RFID tag 325. When the control 326 identifies a change of the command data, it may open or close the fill and drain valve 322. Furthermore, a mechanical activation of the fill and drain valve 322 can be provided at the service panel 320, such as a handle or lever (not illustrated). This mechanical handle or lever can be operated (activated and closed) by the robot arm 220 and/or a corresponding item (not illustrated) of the servicing equipment interface 222.

It is to be understood that this process can be performed also for opening the fill and drain valve 322 to drain the water tank 310, such as before filling potable water into the tank 310. Likewise, a similar process can be performed to open and close a waste valve 328 configured to open and close a fluid connection between a waste coupling 327 and a waste pipe 329 being connected with the waste tank 312. The latter, of course, requires the servicing equipment interface 222 to be coupled to the waste coupling 327 and the ground service unit 200 to have a waste tank 260 and associated servicing equipment.

Once servicing is ended, the robot arm 220 moves servicing equipment interface 222 away from the service panel 320. The robot arm 220 may further be configured to close a flap of the aircraft service panel 320 (the flap being illustrated by dashed lines in FIG. 5). Likewise, the robot arm 220 may be configured to open this flap at the beginning of the servicing.

Moreover, at least one service parameter can be written into the transponder 325 after the servicing is completed. This writing can be achieved by RFID writing unit 240W of the ground service unit 200 by generating a corresponding RF signal 247W. The RFID tag 325 receives this signal 247W and is configured to store the corresponding data transmitted with this signal 247W.

The service parameter may include the following exemplarily data listed in Table 2:

TABLE 2

| possible data types (service parameter) written into RFID tag 325 | |
|---|---|
| Description | Rational |
| General | |
| Service unit identification (Unit code/operator code) | Traceability |
| UTC time stamp/date | Traceability |
| Water system specific data | |
| Water service confirmation | Confirmation of successfully performed water servicing (filling or draining) |
| Filled water volume | Replenished water volume for accounting |
| Drained water volume[1] | Drained water volume for accounting |
| Waste system specific data | |
| Water service confirmation | Confirmation of successfully performed water servicing |
| Drained waste volume | Drained waste volume for accounting |
| Actual rinse fluid type | Rinse fluid type as evidence for correct servicing |
| Actual rinse volume | Rinse volume as evidence for correct servicing |
| Actual pre-charge volume | Pre-charge volume as evidence for corred servicing |

Figure 6:
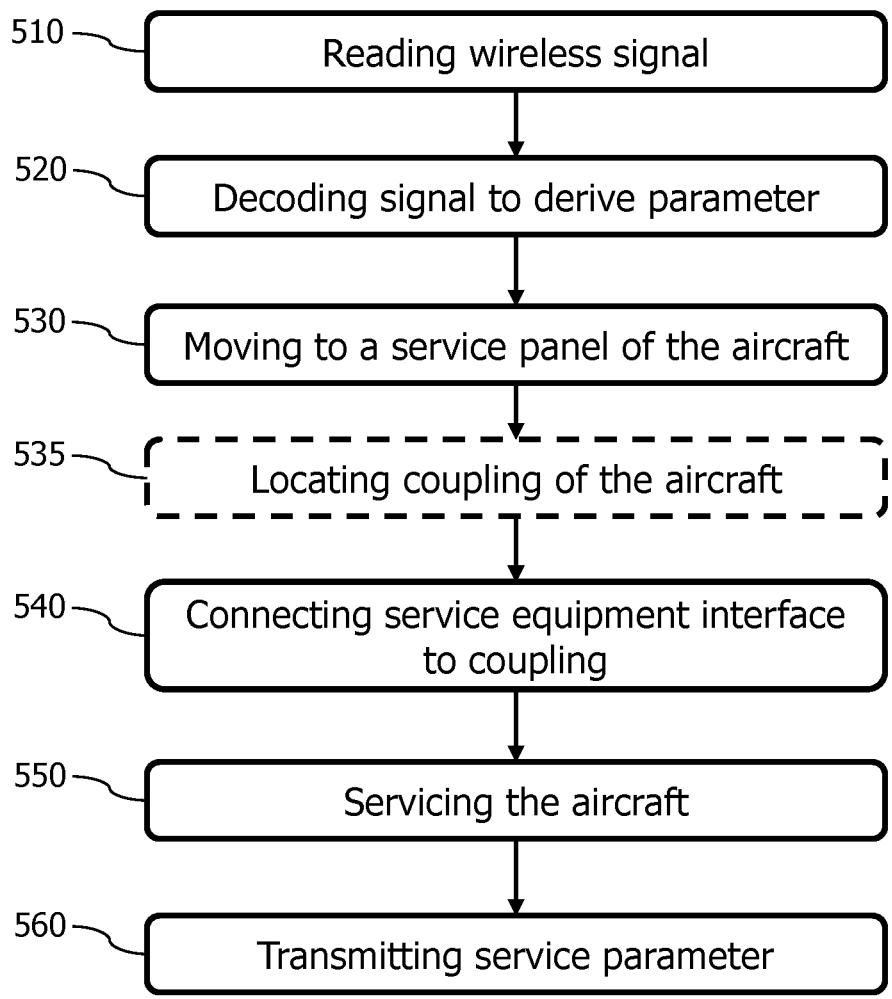
FIG. 6 schematically illustrates a flow diagram of a method for servicing an aircraft.

FIG. 6 schematically illustrates a flow diagram of a method for servicing an aircraft 300. The method starts with reading, in step 510, a wireless parameter signal from a transponder 325 at the aircraft 300, and decoding, in step 520, the wireless parameter signal to derive at least one aircraft parameter, such as an aircraft parameter of a water supply systems 310 and/or a waste system 312 of the aircraft 300. This aircraft parameter can be any of the data types listed in Table 1. The aircraft parameter can be used to set a ground service unit 200 or choose a suitable ground service unit 200 for the aircraft 300 and its servicing needs.

The ground service unit 200 can then move, in step 530, itself and/or its servicing equipment interface 222 to a service panel 320 of the aircraft 300. Thereafter in step 540, a servicing equipment interface 222 is connected to a coupling 321, 327 at the service panel 320. This connection allows servicing, in step 550, the aircraft 300 via the servicing equipment interface 222 and corresponding to the at least one aircraft parameter.

After the servicing is completed, at least one service parameter is written into the transponder 325, in step 560. The aircraft parameter can be any of the data listed in Table 2. This writing of at least one service parameter into the transponder 325 can include transmitting an RF signal controlling the transponder 325 to store the service parameter. Thus, any information about the servicing can be derived at a later point of time from the transponder 325. For example, in the next flight cycle of the aircraft or when the aircraft is powered on the next time, the aircraft data network 330 may read the service parameter from the RFID tag 325 (transponder), such as by the RFID reading unit 340R.

The moving to the service panel 320 in step 530 may include moving the ground service unit 200 in proximity to the service panel 320, for example using the drive unit 275. In other words, the ground service unit 200 is moved towards the aircraft, but still at a distance that does not allow servicing.

The method may further comprise, in step 535, locating the coupling 321, 327 of the aircraft service panel 320 using the wireless parameter signal from the transponder 325. Such locating may further allow moving a servicing equipment interface 222, for example, with a service robot arm 220, to the service panel 320 and, particularly, to the respective coupling 321, 327.

It is to be understood that moving the ground service unit 200 may also be performed manually by a ground staff or semi-autonomous, for example by a ground staff in the near of the aircraft, while the drive unit 275 autonomously moves the ground service unit 200 close to the service panel 320.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

There is no need to introduce a fully automated solution as described above directly. Rather, it is conceivable as a first step to introduce a partially automated solution in which the service cart is still driven by the human operator. Only the data for filling and draining a tank is used and, if necessary, the robot arm for establishing the connection to the aircraft service panel. The transmission of the data to a ground service control center before the ground service cart reaches the aircraft enables the optimized use of the fleet of ground service units to serve several aircraft at an airport or to prepare them ideally for the required task. Autonomous driving of the service units can be added as a further step at a later date.

A combined fleet of manual driven and fully-automated service units is also possible.

The systems and devices described herein may include a controller, such as the service unit controller 210, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices.

Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for servicing an aircraft by a ground service unit, the method comprising:
   reading a wireless parameter signal from a transponder at the aircraft;
   decoding the wireless parameter signal;
   deriving at least one aircraft parameter of from the decoded wireless parameter signal, the at least one aircraft parameter corresponding to at least one of a water supply system or a waste system of the aircraft;
   moving a servicing equipment interface to a service panel of the aircraft;
   connecting the servicing equipment interface to a coupling at the service panel;
   servicing the aircraft via the servicing equipment interface corresponding to the at least one aircraft parameter;
   calculating a result corresponding to the at least one aircraft parameter and the servicing of the aircraft; and
   writing at least one service parameter into the transponder at the aircraft corresponding to the result.

2. The method according to claim 1, further comprising:
   locating the coupling of the aircraft using the wireless parameter signal from the transponder.

3. The method according to claim 1, wherein moving to the service panel comprises moving the ground service unit in proximity to the service panel and moving the servicing equipment interface with a service robot arm to the service panel and the coupling.

4. The method according to claim 1, wherein at least one of:
   the at least one aircraft parameter comprises at least one of:
      a fill level of a water tank of the water supply system,
      an indication to drain the water tank,
      a required fill level of the water tank,
      a maximum allowed filling pressure of the water supply system,
      a maximum tank volume of the water tank,
      a fill level of a waste tank of the waste system,
      a maximum tank volume of the waste tank,
      a rinse fluid type for the waste tank, a required minimum rinse time for the waste tank,
      a maximum allowed rinsing pressure of the waste system,
      a pre-charge fluid type for the waste tank, or
      a pre-charge fluid volume for the waste tank, or
   the at least one aircraft parameter comprises:
      an aircraft identification,
      an aircraft servicing requirement indication, or
      a position information of the service panel.

5. The method according to claim 1,
   wherein the at least one service parameter comprises at least one of:
      an identification of the ground service unit,
      a timestamp,
      a water service confirmation,
      a filled water volume,
      a drained water volume,
      a waste service confirmation,
      a drained waste volume,
      a rinse fluid type for the waste system,
      a rinse fluid volume for the waste system, or
      a pre-charge volume for a waste tank of the waste system.

6. An aircraft service panel comprising:
   a fill and drain coupling configured to be connected to a servicing equipment interface;
   a fill and drain valve configured to open and close a fluid connection between the fill and drain coupling and a fill and drain pipe; and
   a transponder configured to store water supply data indicating at least one aircraft parameter of a water supply system, to transmit the stored water supply data, to generate a location signal identifying at least one of a position of the transponder or a position of the fill and drain coupling, and to store a calculated result corresponding to the at least one aircraft parameter and a servicing of the water supply system.

7. The aircraft service panel of claim 6, further comprising:
   a service panel control configured to operate the fill and drain valve,
   wherein the transponder is further configured to receive a control signal to open or close the fill and drain valve.

8. The aircraft service panel of claim 6, wherein the transponder comprises a passive radio-frequency identification, RFID, tag configured to store data, to transmit the stored data when powered by an RFID reader, and to generate a radio-frequency location signal, or an active RFID tag configured to store data, to transmit the stored data when activated by a power supply, and to generate a radio-frequency location signal.

9. An aircraft comprising:
   an aircraft service panel of claim 6 and at least one of:
      at least one water tank configured to store a water supply, the at least one water tank being fluidly connected to the fill and drain pipe of the aircraft service panel; or
      an RFID reading/writing device configured to at least store the water supply data in the transponder of the aircraft service panel.

10. The aircraft of claim 9, further comprising:
    an aircraft data network configured to request data indicating at least one parameter of the at least one water tank and to transmit the requested data to the RFID reading/writing device for storing the at least one parameter as water supply data in the transponder,
    wherein, the at least one parameter of the at least one water tank comprises at least one of:
       a fill level of the at least one water tank,
       an indication to drain the water tank,
       a required fill level of the water tank,
       a maximum allowed filling pressure of the water tank, or
       a maximum tank volume of the water tank.

11. The aircraft of claim 10,
    wherein the aircraft data network is further configured to request data indicating at least one parameter of at least one waste tank and to transmit the requested data to the RFID reading/writing device for storing the at least one parameter as waste data in the transponder, wherein, the at least one parameter of the at least one waste tank comprises at least one of:
a fill level of the waste tank,
a maximum tank volume of the waste tank,
a rinse fluid type for the waste tank,
a required minimum rinse time for the waste tank,
a maximum allowed rinsing pressure of the waste tank,
a pre-charge fluid type for the waste tank, or
a pre-charge fluid volume for the waste tank.

12. An aircraft servicing system, comprising:
an aircraft according to claim 10; and
a ground service unit comprising a servicing equipment interface configured to connect to the fill and drain coupling or waste coupling of the aircraft service panel of the aircraft.

13. The aircraft servicing system according to claim 12, wherein the ground service unit comprises at least one of:
a drive unit to move the ground service unit in proximity to the aircraft service panel,
a robot arm coupled to the servicing equipment interface and configured to move the servicing equipment interface to the aircraft service panel,
an RFID reading unit configured to read the water supply data,
the location signal transmitted by the transponder of the aircraft service panel,
an RFID writing unit configured to write at least one service parameter into the transponder of the aircraft service panel, and a service unit controller configured to control at least one of the servicing equipment or the servicing equipment interface to service the aircraft.

14. The aircraft servicing system according to claim 12, further comprising:
a ground service control center configured to communicate with the aircraft and the ground service unit, and further configured to control movement of the ground service unit and control servicing of the aircraft by the ground service unit.

15. An aircraft service panel comprising:
a waste coupling configured to be connected to a servicing equipment interface;
a waste valve configured to open and close a fluid connection between the waste coupling and a waste pipe; and
a transponder configured to store waste data indicating at least one aircraft parameter of a waste system, to transmit the stored waste data, to generate a location signal identifying at least one of a position of the transponder or a position of the waste coupling, and to store a calculated result corresponding to the at least one aircraft parameter and a servicing of the waste system.

16. The aircraft service panel of claim 15, further comprising:
a service panel control configured to operate the waste valve,
wherein the transponder is further configured to receive a control signal to open or close the waste valve.

17. The aircraft service panel of claim 15, wherein the transponder comprises a passive radio-frequency identification, RFID, tag configured to store data, to transmit the stored data when powered by an RFID reader, and to generate a radio-frequency location signal, or an active RFID tag configured to store data, to transmit the stored data when activated by a power supply, and to generate a radio-frequency location signal.

18. An aircraft comprising:
an aircraft service panel of claim 15, and
at least one waste tank configured to store waste, the at least one waste tank being fluidly connected to the waste pipe of the aircraft service panel.

* * * * *